United States Patent
Barberis et al.

(10) Patent No.: US 8,462,646 B2
(45) Date of Patent: Jun. 11, 2013

(54) CHARACTERIZATION OF CO-CHANNEL INTERFERENCE IN A WIRELESS COMMUNICATION SYSTEM

(75) Inventors: Sergio Barberis, Turin (IT); Paolo Priotti, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 12/449,437

(22) PCT Filed: Feb. 9, 2007

(86) PCT No.: PCT/EP2007/051302
§ 371 (c)(1),
(2), (4) Date: Aug. 7, 2009

(87) PCT Pub. No.: WO2008/095543
PCT Pub. Date: Aug. 14, 2008

(65) Prior Publication Data
US 2010/0097948 A1    Apr. 22, 2010

(51) Int. Cl.
*G01R 31/08* (2006.01)
(52) U.S. Cl.
USPC .......................... 370/252; 370/302; 375/260
(58) Field of Classification Search
USPC ................ 370/352, 249, 252–253, 280–281, 370/333–338, 354–356, 490–497; 455/69, 455/67
See application file for complete search history.

(56) References Cited

U.S. PATENT DOCUMENTS

| | | | |
|---|---|---|---|
| 5,956,642 A | 9/1999 | Larsson et al. | |
| 7,768,978 B2 * | 8/2010 | Numakura et al. | 370/333 |
| 2006/0039318 A1 | 2/2006 | Oh et al. | |
| 2006/0092054 A1 * | 5/2006 | Li et al. | 341/67 |
| 2006/0092881 A1 * | 5/2006 | Laroia et al. | 370/331 |
| 2006/0155533 A1 | 7/2006 | Lin et al. | |
| 2006/0155534 A1 | 7/2006 | Lin et al. | |
| 2006/0161432 A1 * | 7/2006 | Zhang et al. | 704/238 |
| 2006/0165188 A1 | 7/2006 | Wunder et al. | |

(Continued)

FOREIGN PATENT DOCUMENTS

| | | |
|---|---|---|
| EP | 1 722 512 A1 | 11/2006 |
| JP | 2005-318434 | 11/2005 |

(Continued)

OTHER PUBLICATIONS

Riga, "R1-063479: Open Loop Vs. Closed Loop Inter-Cell Power Control Performance Comparison for the E-UTRA Uplink", Lucent Technologies, 3GPP TSG-RAN WG1 #47, pp. 1-6, (2006).

(Continued)

*Primary Examiner* — Ricky Ngo
*Assistant Examiner* — Iqbal Zaidi
(74) *Attorney, Agent, or Firm* — Finnegan, Henderson, Farabow, Garrett & Dunner, L.L.P.

(57) ABSTRACT

A method for characterizing interference in a radio communication system including a plurality of radio transceiver stations configured to communicate with user equipment, includes: measuring, by user equipment in radio communication with a serving transceiver station, quantities indicative of interference from interfering transceiver stations; sending the measured quantities to the serving transceiver station; associating at least one codebook with the serving transceiver station, the codebook including a number of codewords each representing a respective quantized interference situation in an area covered by the serving transceiver station; and identifying in the codebook a codeword representative of the quantities measured by the user equipment.

41 Claims, 5 Drawing Sheets

U.S. PATENT DOCUMENTS

| | | | |
|---|---|---|---|
| 2006/0270360 A1* | 11/2006 | Han et al. | 455/69 |
| 2007/0026884 A1 | 2/2007 | Rao | |
| 2007/0049218 A1* | 3/2007 | Gorokhov et al. | 455/102 |
| 2008/0101321 A1* | 5/2008 | Cheng et al. | 370/342 |

FOREIGN PATENT DOCUMENTS

| | | |
|---|---|---|
| WO | WO-2005/060132 A1 | 6/2005 |
| WO | WO-2005/125020 A1 | 12/2005 |
| WO | WO 2006/129958 A1 | 12/2006 |
| WO | WO-2008/096383 A1 | 8/2008 |

OTHER PUBLICATIONS

"Physical Layer Aspects for Evolved Universal Terrestrial Radio Access (UTRA)", 3$^{rd}$ Generation Partnership Project; Technical Specification Group Access Network, (Release 7); 3GPP TR, 25.814, v7.1.0, pp. 1-132, (2006).

"Revised Text Proposal for TR R3.018 on RRM in LTE", Siemens, 3GPP TSG RAN WG3 Meeting #52, R3-06772, pp. 1-3, (2006).

Riga, "R1-063478: Uplink Scheduling With Inter-Cell Power Control, With Extensions to Interference Coordination", Lucent Technologies, 3GPP TSG-RAN WG1 #47, pp. 1-7, (2006).

Thomas et al., "Feedback of Codebook Selection and MIMO Stream Power", IEEE 802.16 Broadband Wireless Access Working Group, pp. 1-7, (2004).

Barberis et al., "Characterization of Co-Channel Interference in a Wireless Communication System", U.S. Appl. No. 12/449,438, filed Aug. 7, 2009.

International Search Report from the European Patent Office for International Application No. PCT/IT2007/000695 (May 19, 2008).

International Search Report from the European Patent Office for International Application No. PCT/IT2007/051302 (Mar. 17, 2008).

Gersho et al, "Vector Quantization and Signal Compression" Kluwer Academic Publishers, pp. 602, 620, Norwell, Massachusetts (1991).

Translation of JP 2005-318434.

Translation of Notice of Reason for Rejection, Japanese Patent Application 2009-548586.

* cited by examiner

CHARACTERIZATION OF CO-CHANNEL INTERFERENCE IN A WIRELESS COMMUNICATION SYSTEM

CROSS REFERENCE TO RELATED APPLICATION

This application is a national phase application based on PCT/EP2007/051302, filed Feb. 9, 2007.

TECHNICAL FIELD OF THE INVENTION

The present invention relates in general to wireless communication systems, and more specifically to co-channel interference characterization, feedback reduction and interference mitigation in cellular and non-cellular radio communication systems.

In particular, cellular radio communication systems where the present invention may find advantageous, but not limitative application, are for example the so-called beyond-3G (3rd Generation) cellular radio communication systems, i.e. new generation cellular radio communication systems having a wider transmission bandwidth than 3G cellular radio communication systems, such as for example those known as Third Generation Partnership Project Long Term Evolution (3GPP LTE) cellular radio communication systems.

Non-cellular radio communication systems where the present invention may find advantageous, but not limitative application are for example Wireless Local Area Networks (WLANs), and in particular WiMAX, which is defined as Worldwide Interoperability for Microwave Access by the WiMAX Forum, formed to promote conformance and interoperability of the IEEE 802.16 standard, officially known as WirelessMAN, and which is described by the Forum as "a standard-based technology enabling the delivery of last mile wireless broadband access as an alternative to cable and DSL".

BACKGROUND ART

Cellular phone systems and portable/mobile user equipments/terminals based on cellular radio communication have evolved in the past years from analogue, narrowband Frequency Division Multiple Access (FDMA) transmission ($1^{st}$ generation (1G) cellular radio communication systems), first to digital, narrowband Frequency and Time Division Multiple Access (FDMA/TDMA) transmission ($2^{nd}$ generation (2G) cellular radio communication systems), and later to digital, broadband Code Division Multiple Access (CDMA) transmission ($3^{rd}$ generation (3G) cellular radio communication systems).

Now, research is moving towards new generation cellular radio communication systems having a wider transmission bandwidth than 3G cellular radio communication systems, such as for example those known as 3GPP LTE cellular radio communication systems. When transmission bandwidth increases, transceivers typically show an increase in their circuit complexity, depending on the type of modulation and multiplexing used. When the bandwidth of the transmission systems becomes larger than a few MHz (about 10 MHz), a multi-carrier modulation is often more suitable to keep the transceivers circuit complexity as low as possible.

In particular, Orthogonal Frequency Division Multiplexing (OFDM) has proved to be particularly suited to use with cost-efficient transceivers that process signals in the frequency domain both on the transmitting and receiving sides. More in detail, OFDM is based upon the principle of frequency-division multiplexing (FDM), but is implemented as a digital modulation scheme. Specifically, the bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross-talk between the sub-channels is eliminated. This orthogonality occurs when sub-carriers are equally spaced by the symbol rate of a sub-carrier. The primary advantage of OFDM is its capability to cope with severe channel conditions—for example, multi-path and narrowband interference—without complex equalization filters. Channel equalization is simplified by using many slowly modulated narrowband signals instead of one rapidly modulated wideband signal. 3GPP LTE cellular radio communication systems are expected to use an OFDM-based physical layer. In particular the first one is expected to have an OFDM-based downlink and a Single-Carrier Frequency Division Multiple Access (SC-FDMA)-based uplink.

Outside the cellular radio communication systems, transceivers have evolved earlier towards large bandwidths. For example WLANs complying with the IEEE802.11 standards family use a 20 MHz channel, and transmit with a 64-subcarrier OFDM modulation. More specifically, in WLANs, transmission is governed by a Medium Access Control (MAC) protocol, called Carrier Sense Multiple Access with Collision Avoidance (CSMA-CA), that avoids transmission when a given frequency channel is already in use. For this reason, inside a given WLAN cell, there is usually no direct co-channel interference between different transceivers. Moreover, in a hot-spot kind of territory coverage, WLAN cells are usually physically separated, so that other-cell interference is largely limited in most cases. However, in 3GPP LTE cellular radio communication systems, OFDM is expected to work in a very different environment compared to WLANs. In fact, in a cellular radio communication system, where a continuous radio coverage is required, the signal transmitted by a transceiver station in downlink (DL) or by a terminal or user equipment (UE) in uplink (UL) can overlap the service area of neighbouring cells. Demands for high spectral efficiency, on the other hand, practically prevent the use of high frequency reuse like in 2G cellular radio communication systems, so that it is expected that for example in LTE radio communication systems the frequency reuse factor will be low, if not unitary. In LTE radio communication systems it is likely that especially at the cell edge very strong co-channel, intra-system interference will be present, substantially lowering user throughput if not properly mitigated. Inter-cell interference can be mitigated by using for example Radio Resource Management (RRM) mechanisms (i.e. interference coordination) or layer-1 mechanisms, such as spatial suppression by means of multiple antennas and cancellation based on detection/subtraction of the inter-cell interference. A classification of these mechanisms can be found for example in 3GPP TR 25.814 "Physical layer aspect for evolved Universal Terrestrial Radio Access (UTRA)" sec. 7.1.2.6.

OBJECT AND SUMMARY OF THE INVENTION

The Applicant has noted that RRM mechanisms aiming at interference control and mitigation can have some drawbacks. In particular, with reference to a downlink transmission (the same conclusions applying also to an uplink transmission):

in case interference control is based on the knowledge of the interference situation inside the cell, this implies that sets of interference measurements should be performed (presumably by the user equipments). As the overall OFDM spectrum is divided into sub-carrier blocks, or more specifically, subsets of one or more subcarriers for one or more consecutive OFDM symbols, generally referred to as Physical Resource Blocks (PRBs), the user equipments can perform these sets of measurements for each PRB or can perform a number of sets of measurements lower than the number of PRBs. The capability to distinguish which one of the neighbouring cells interference comes from implies that each user equipment should have knowledge of cell-specific training sequences (pilot signal sequences), and the previous step inevitably leads to the use of memory space, computation resources and consequent power consumption in the user equipment;

interference measurements should be fed back to the serving transceiver station, which implies utilization of uplink bandwidth;

RRM algorithms attaining global optimization of system throughput via interference control go beyond computation and signaling capability of the system (because of excessive computational and/or signaling load).

The objective of the present invention is therefore to provide a methodology which can alleviate at least some of the above cited drawbacks, and in particular which allows interference mitigation to be performed with simple algorithms and light computational load. It also allows reduction in uplink signaling bandwidth.

This objective is achieved by the present invention in that it relates to a method for characterizing interference in a radio communication system, a method for mitigating interference in a radio communication system, and a system and a computer program product configured to implement this interference characterization method, as defined in the appended claims.

The present invention achieves the aforementioned objective by mapping and characterizing the interference situation inside a cell of the cellular radio communication system by using vector quantization and without using any information about the position of the user equipments. Specifically, the present invention proposes to utilize, in each or a group of the transceiver stations, generally referred to as Node B, of the cellular radio communication system, a codebook made up of codewords defined by respective representative vectors that represent and characterize, via vector quantization, any interference situation present in the cell served by the transceiver station. Each codeword in the codebook is made up of a given number of components (or dimensions), each representing the interference power of a given interfering transceiver station, and the values assumed by the number of the codeword components at a certain time instant represent a point in a vector space whose dimensions are the interference powers.

In an aspect of the present invention, the number of components of each codeword is chosen so that all of the main interfering transceiver stations can be taken into account.

Specifically, the user equipments in a given cell send feedback messages to the transceiver station supervising the cell, the feedback messages containing the interference power that the user equipments in the cell receive from each one of the main interfering transceiver stations. Based on these feedback massages, the codebook can evolve dynamically in time so as to ensure that, in every moment, the interference situation of the cell is represented within an acceptable quantization error.

Preferably, a subset of codewords may be kept invariant in time to minimize the quantization error when new user equipments enter the cell.

The transceiver station can choose one codeword to represent each one of the user equipments in the cell, and a codeword can also represent more than one user equipment.

The present invention can be used advantageously to develop interference control and reduction algorithms based on a good knowledge of the influence that every interfering transceiver station produces on its neighbouring cells. These algorithms should also be conceived to allow messages between different transceiver stations to be exchanged to negotiate a possible reduction of the radiated interference power over any PRBs when needed. The present invention can also be adopted to effectively reduce uplink feedback messages. In particular, vector quantization can be used to perform the so called user equipment grouping. Specifically, when different user equipments send to the respective transceiver station feedback messages that are represented by the same codeword, then these user equipments can be grouped together. Subsequently, and for a predetermined time interval, the transceiver station can request measurement feedback messages from only one or a few of these user equipments acting as a representative sample of the group, instead of the whole group. The user equipments belonging to a given group can also send feedback messages in a round robin fashion until the serving transceiver station estimates that the interference situation sustained by the members of the group diverges.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following description is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Additionally, in the following, without losing generality, reference will be made to a 3GPP LTE cellular radio communication system, remaining clear that the present invention can also be applied to other type of cellular or non-cellular systems such as WiMAX or WLANs. For this reason, when referring to a transceiver station being part of the network infrastructure, the terminology "Node B", that is the terminology commonly adopted in 3GPP LTE cellular radio communication systems, will be used.

Figure 1B:
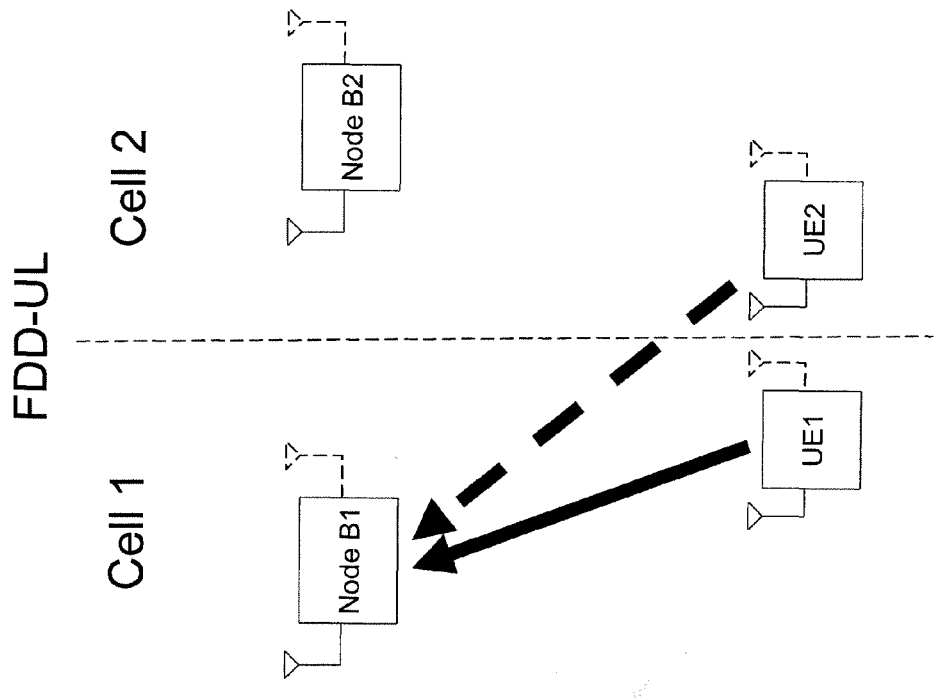
FIGS. 1a and 1b show schematically an FDD-DL and, respectively, an FDD-UL transmission case between two Node Bs of a cellular radio communication system and two user equipments each served by a respective Node B.
Figure 1A:
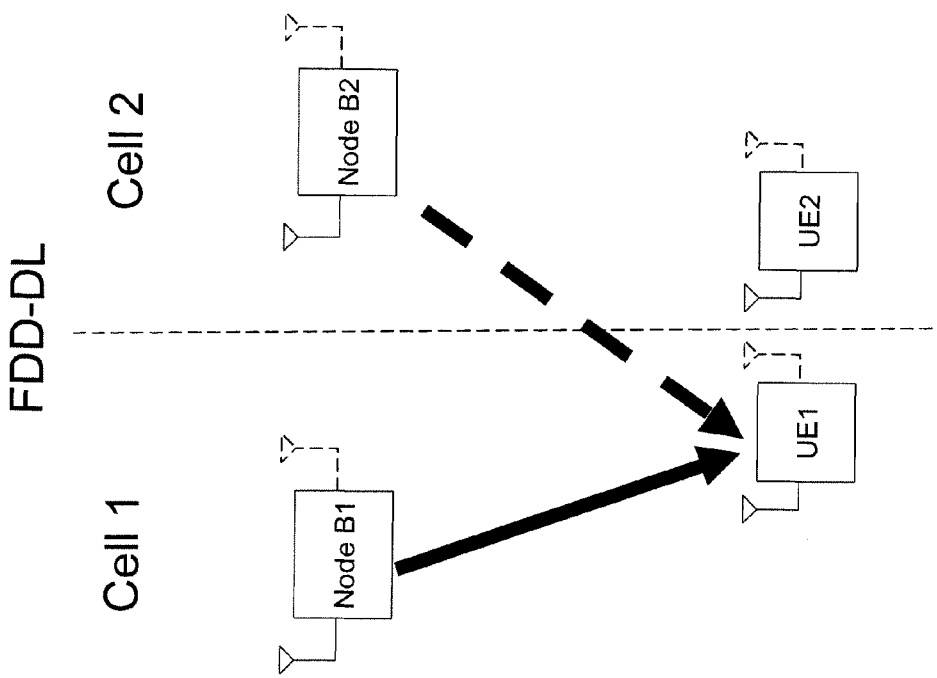

As an example, FIGS. 1a and 1b show schematically two Node Bs, designated by Node B1 and Node B2, of a 3GPP LTE cellular radio communication system and two user equipments, designated by UE1 and UE2, each served by a respective Node B. In particular, FIG. 1a shows an FDD-DL (Frequency Division Duplexing-Downlink) transmission case, while FIG. 1b shows a FDD-UL (Frequency Division Duplexing-Uplink) transmission case. Additionally, in both FIGS. 1a and 1b the solid lines represent useful signals, while the dashed lines represent inter-cell interference.

Figure 2:
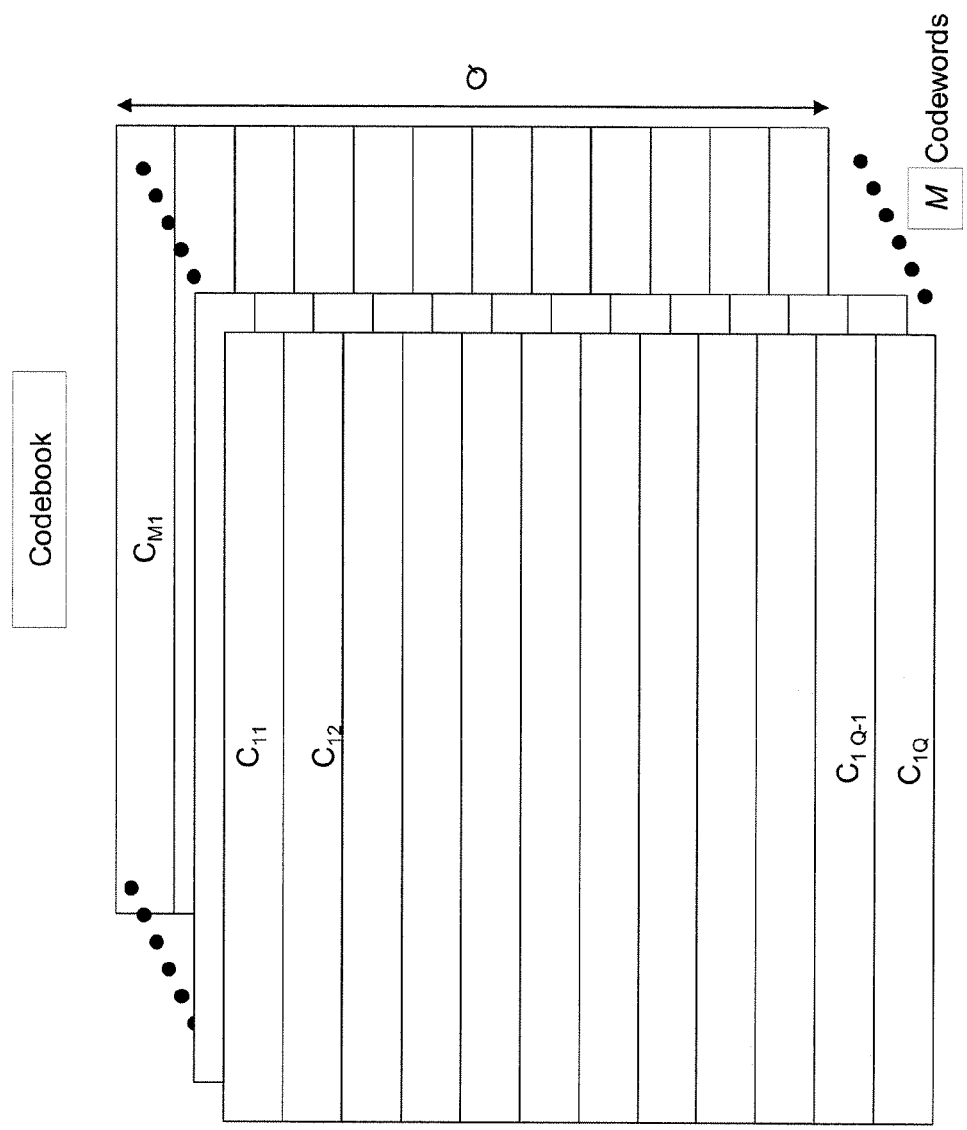
FIG. 2 shows a codebook associated with a Node B of the cellular radio communication system of FIG. 1.

In the communication system under consideration, an assumption is made that an OFDMA-based downlink (DL) is adopted and that every Node B in the communication system is associated with a Codebook (CB) defined by a collection of M codewords (CW), each made up of Q components. The codewords forming the codebook are shown in FIG. 2.

A codeword can be expressed as follows:

$$\underline{C}_i = \{C_{i,1}, \ldots, C_{i,Q}\}, i=1\ldots M \quad (1)$$

while a codebook can be expressed as follows:

$$\chi = \{\underline{C}_1, \ldots, \underline{C}_M\} \quad (2)$$

For the sake of simplicity, a single physical resource block (PRB) will be considered and an assumption will be made that the codebook refers to that specific physical resource block. In a real implementation, one codebook for every physical resource block could be needed.

Each one of the Q components in a codeword represents the interference power of a specific Node B interfering with the serving Node B under consideration.

In the present invention for "interfering Node Bs of the serving Node B" we intended those Node Bs that could use the same set or subset of frequency resources of the serving Node B.

In a real implementation, the components of each codeword are numbers representing quantized interference power.

Let's additionally suppose that each user equipment in the cell measures the interfering power coming from Q different interference sources. The k-th user equipment periodically feeds back to the serving Node B a vector of Q ordered values, which can be represented as follows:

$$\varphi_{nk} = \{p_1, \ldots, p_Q\} \quad (3)$$

where n is a time instant and the dependency of $\{p_1, \ldots, p_Q\}$ from n and k has been dropped for the sake of simplicity of notation.

Vector quantization is then used to find one representative (codeword) of the feedback $\varphi_{nk}$ in the codebook. If a quantization based on the Euclidean norm is adopted, then the representative codeword can be expressed as follows:

$$VQ(\varphi_{nk}) = \underline{C}_i \Leftrightarrow \underline{C}_i = \arg\min_{1 \leq i \leq M} \left( \sum_{j=1}^{Q} (C_{ij} - p_j)^2 \right) \quad (4)$$

Other types of norm are also applicable to the invention. As an example, a different type of norm is also proposed, where it is possible to distinguish two groups of interferers, having different weights α and β.

$$VQ(\varphi_{nk}) = \underline{C}_i \Leftrightarrow \underline{C}_i = \arg\min_{1 \leq i \leq M} \left( \alpha \cdot \sqrt{\sum_{j=1}^{Q_1} (C_{ij} - p_j)^2} + \beta \cdot \sqrt{\sum_{j=Q_1+1}^{Q} (C_{ij} - p_j)^2} \right) \quad (4')$$

The dimensions (components) relative to the first group of interfering Node Bs are $\{p_1, \ldots, p_{Q_1}\}$, while those relative to the second group are $\{p_{Q_1+1}, \ldots, p_Q\}$.

The number of components Q in each codeword is determined in a design stage and may vary depending on specific needs, but conveniently it should be at least as big as the number of cells in the first tier of interfering cells around the serving Node B. A more precise design could take into account also the second tier of interfering cells around the serving Node B. For example, in case of hexagonal cell layout, there are six cells immediately around a serving Node B, so Q=6. If the second tier of interfering cells is taken into account, then Q=18. Also different values of Q could be adopted in practical implementations. For example in simpler implementations only a subset of the first tier or the first and second tier of interferers can be taken into account. Implementers can choose to select only the interfering Node Bs of the serving cell that on average have the strongest influence on the serving cell.

Figure 3:
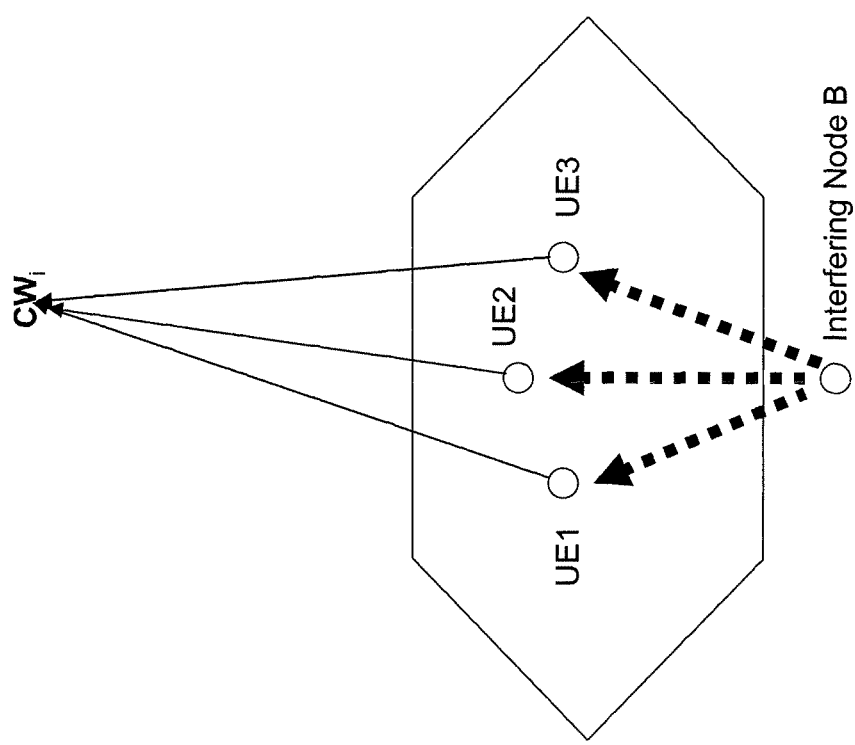
FIG. 3 shows schematically an interference scenario involving an interfering Node B and three user equipments sending to the Node B feedback messages having the same representative codeword.

The values assumed by the components of a codeword at a certain time instant represent a point in the vector space whose dimensions are interference powers. It is important to stress that the codewords do not contain any information about geographical positioning of a specific user equipment, but only information about the interference power sustained by the user equipment. At a given time instant n, there is a correspondence between geographical positions of the user equipments inside the cell and the codewords, but this is not in general, a bi-univocal correspondence. This concept is illustrated in FIG. 3, where it is assumed to have a single interfering Node B that has the same path-loss towards three different user equipments. In this case, the three user equipments, although geographically located in different points of the cell, are sustaining the same interference power and hence send to the Node B feedback messages having the same representative codeword. In general, the interference situation seen by two user equipments represented by the same codeword do not need to be very close to each other, but can be somewhat different, meaning that the two feedback vectors have a certain respective distance.

The number of codewords M in a codebook can be fixed or variable in time, a higher M in general leads to a smaller average vector quantization error. Specifically, M should be designed in such a way that the average quantization error for every interference situation (intended as power vector) sustained by the user equipments in the cell is below a given threshold, where the quantization error may be defined as follows:

$$\varepsilon(\varphi_{nk}) = \sqrt{\sum_{j=1}^{Q} (C_{ij} - p_j)^2}, \quad (5)$$

$$VQ(\varphi_{nk}) = \underline{C}_i$$

When a Node B is first activated, the respective codebook is pre-set to standard values. In the following, some examples of convenient initialization are given:

- a collection of many measurements of interference power of different interfering cells can be used as vector space to be partitioned in subsets (as well-known from the theory of vector quantization), and the centroids of the partitions (subsets) then constitute the codebook for initialization. The codebook obtained in this way could likely depend on cell shape and as such, at least one codebook should be available for every shape. If the measurements are relative to the specific cell the codebook will be used in, then it means that the network adopts a policy including a cell-specific training phase. Otherwise a general, as opposed to cell-specific codebook, will be used;
- the initial codebook could be determined such as to represent very strong interference situations, for example, the interference experienced by user equipments when the path loss from interfering Node Bs is very low. Depending on the kind of interference control algorithm, this kind of codebook could make the Node B initially adopt a large frequency re-use factor, at least in the cell periphery;
- the initial codebook could be pseudo-randomly generated;
- the initial codebook could be such as to represent equal interference power of all the interfering Node Bs. For example, a certain number of codewords could have the same value in all of their rows or a part of the rows, which should correspond to the first tier of interfering Node Bs. Otherwise, each codeword could have only one row different from zero (as to represent interference contributions from a specific Node B only);
- the initial codebook could be such as to represent a wider dynamic range in the values describing the interference powers of the strongest interfering Node Bs, which could coincide with the Node Bs that are geographically closer. A smaller dynamic range can be put in the values describing the Node Bs further away, e.g. those ones in the second tier of interfering Node Bs. This arrangement can be understood thinking that the movement of a user equipment inside a cell means a larger relative variation in distance for the interfering Node Bs closer to the cell. The variation of the received interference power is as such in general large for an interfering Node B in proximity of the cell border. The variation is on the other hand smaller for a interfering Node B farther away from the cell border;
- dividing a cell in a certain number of areas (e.g. divide an hexagonal cell in six triangular symmetrical areas with an edge in the center) and then evenly distributing the codewords in each area assuming that every interfering Node B transmits an equal amount of average power.

After initialization, the Node B then updates the codebook based on feedback messages from the user equipments in the cell supervised by the Node B. Feedback messages contain the interference power that the user equipments in the cell receive from each one of the main interfering Node Bs. As the interference sustained by the user equipments in the cell can change, the codebook can be modified so as to limit the average vector quantization error. Algorithms to dynamically update a codebook have been used in the past, e.g. in the field of voice recognition and are described in the literature (e.g. in Allen Gersho, Robert M. Gray, *Vector Quantization and Signal Compression*, Kluwer Academic Publishers, page 602, page 620). The speed at which the codebook converges to the observed measurements depends on the type of algorithm that is used for interference control and on the overall organization of the feedback chain. For example, if user equipment grouping is performed, codebook convergence cannot be too fast, otherwise this would cause instability in user equipment grouping itself (because fast convergence implies large gradients in the codewords with respect to which grouping is performed). However, the overall effect of the dynamic codebook evolution is that a larger number of codewords converge towards those regions of the vector space where the measurement density is higher.

Optionally, a subset of the codewords in the codebook may be kept fixed, i.e. they do not take part to the dynamic evolution of the codebook, or they could be not strictly invariable but rather could have a limited range of variability. Additionally, in order to minimize the quantization error when new user equipments start to be served by that cell, these invariable or quasi-invariable codewords may be initially distributed in all of the regions of the cell (because they should be relatively close to any user equipment that powers up in any location inside the cell or enters the cell). Their function is especially important in the transitory phase until the codebook converges towards them.

The foregoing description is based on the assumption that the user equipments can measure the interfering power coming from all of the main interfering Node Bs, i.e. the long-term average interference power which is not affected by the rapid variations of the fast fading. The interference power measurements are made possible by the knowledge in the user equipments of cell-specific pilot signals, which are separable based on orthogonality (e.g. code, frequency or time orthogonality). In a different aspect, the Node Bs could be organized with a "chessboard pattern" transmission scheme (a transmission scheme where specific time instants exist when inter-cell interference is limited to the second tier of interferers or less) to guarantee that the interfering power from each interfering Node B can be measured. As PRBs are already separated in frequency, in principle it is not necessary that the pilot signals are PRB-specific.

After a certain transition time, a Node B enters a tracking mode, where it should be able to constantly represent all of the interference situations of the user equipments it is serving within a limited quantization error. In the tracking mode, the system is supposed to work as follows:

- each user equipment that is scheduled for feedback sends to the Node B a set of measured values, relative to the most recent measurement period;
- the Node B performs a vector quantization of the feedback message to find the representative codeword for the feedback message;
- the Node B stores in an interference database representing all served user equipments only indexes for the codewords identified after vector quantization, the stored indexes representing the position of the identified codewords in the codebook, thus requiring a limited quantity of memory;
- the Node B dynamically updates the codebook according to a predetermined criterion described for example in Allen Gersho, Robert M. Gray, *Vector Quantization and Signal Compression*, Kluwer Academic Publishers, page 602, page 620.

Several possible strategies are herebelow described for the reduction of the number of feedback messages sent by the user equipments:

- if analyzing the feedback messages sent by the user equipments it appears that more than one user equipment is sustaining an interference power represented by the same codeword, or by different codewords whose difference has a norm below a given threshold, the Node B can decide to group those user equipments. The Node B can then request a feedback message not to all of the user equipments in a group, but only to one or a few representative user equipments. After a maximum time interval has expired, anyway, up-to-date feedback messages are then requested to all of the user equipments;

the method described in the previous point can be further improved by requesting feedback messages from user equipments in a group in a round robin fashion. The group is modified when one or more user equipments start to diverge from the average interference situation of the group;

the method detailed in the previous points can be optionally restricted to those user equipments having low mobility. An estimate of the mobility of a user equipment can be performed based on the Doppler shift of the pilot signals sent by the user equipment. This is based however on the assumption that each user equipment has a precise carrier frequency reference. Otherwise, a coarse estimate of mobility can be carried out based on the representative codeword for each user equipment: in fact, if the representative codeword changes slowly, a limited mobility can be assumed.

The interference database is the basis for the Node B to decide what actions to try with the purpose of interference limiting/control. When those actions are executed, for example by using an algorithm operating at the RRM level, after a certain delay the user equipments send to the Node B new feedback messages containing the newly observed interference measurements and the codebook starts to converge towards the new observations.

In a real-life implementation, a codebook could exist for each PRB or group of PRBs.

Figure 4:
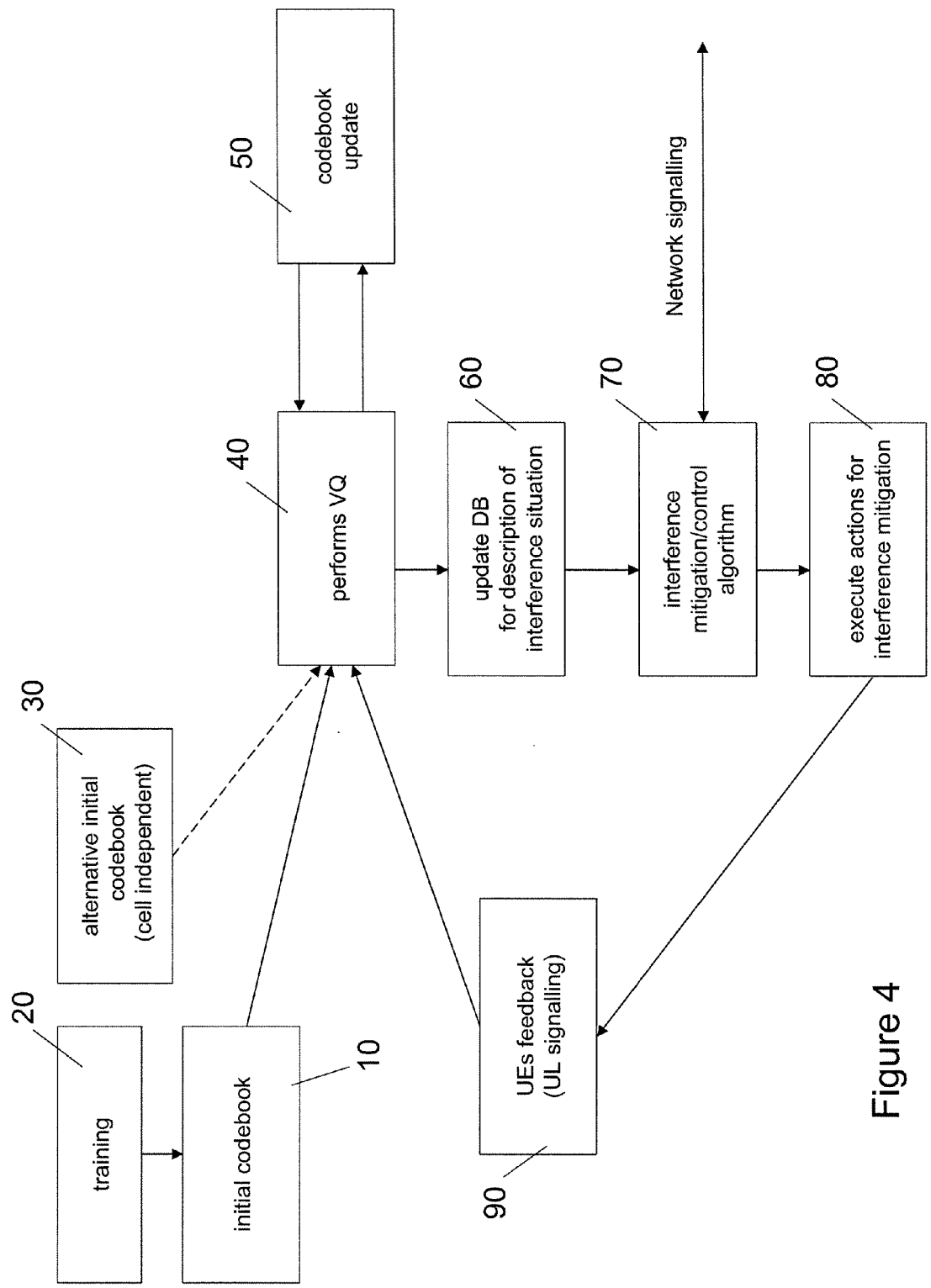
FIG. 4 shows schematically inter-Node B network signaling and uplink radio interface signaling between a serving Node B and interfering Node Bs and a user equipment.

The entire co-channel interference characterization process can be schematically shown in FIG. 4, wherein block 40 represents the vector quantization carried out based on an initial codebook (block 10) obtained after a training step (block 20) or based on a alternative cell-independent initial codebook (block 30), block 50 represents the codebook update, block 60 represents the database update for the description of the interference situation, block 70 represents the execution of an interference mitigation/control algorithm and the corresponding network signaling (requests from neighboring Node Bs and outputs towards neighboring Node Bs), block 80 represents the execution of actions for interference mitigation, and block 90 represents the uplink signaling, namely the feedback messages sent by the user equipments to the Node Bs.

Herebelow, four specific embodiments of the present invention are described, two of which entail the use of a single codebook for the whole transmission bandwidth of the serving transceiver station, i.e. a codebook that is not specific for a given PRB or a group of PRBs.

Figure 5:
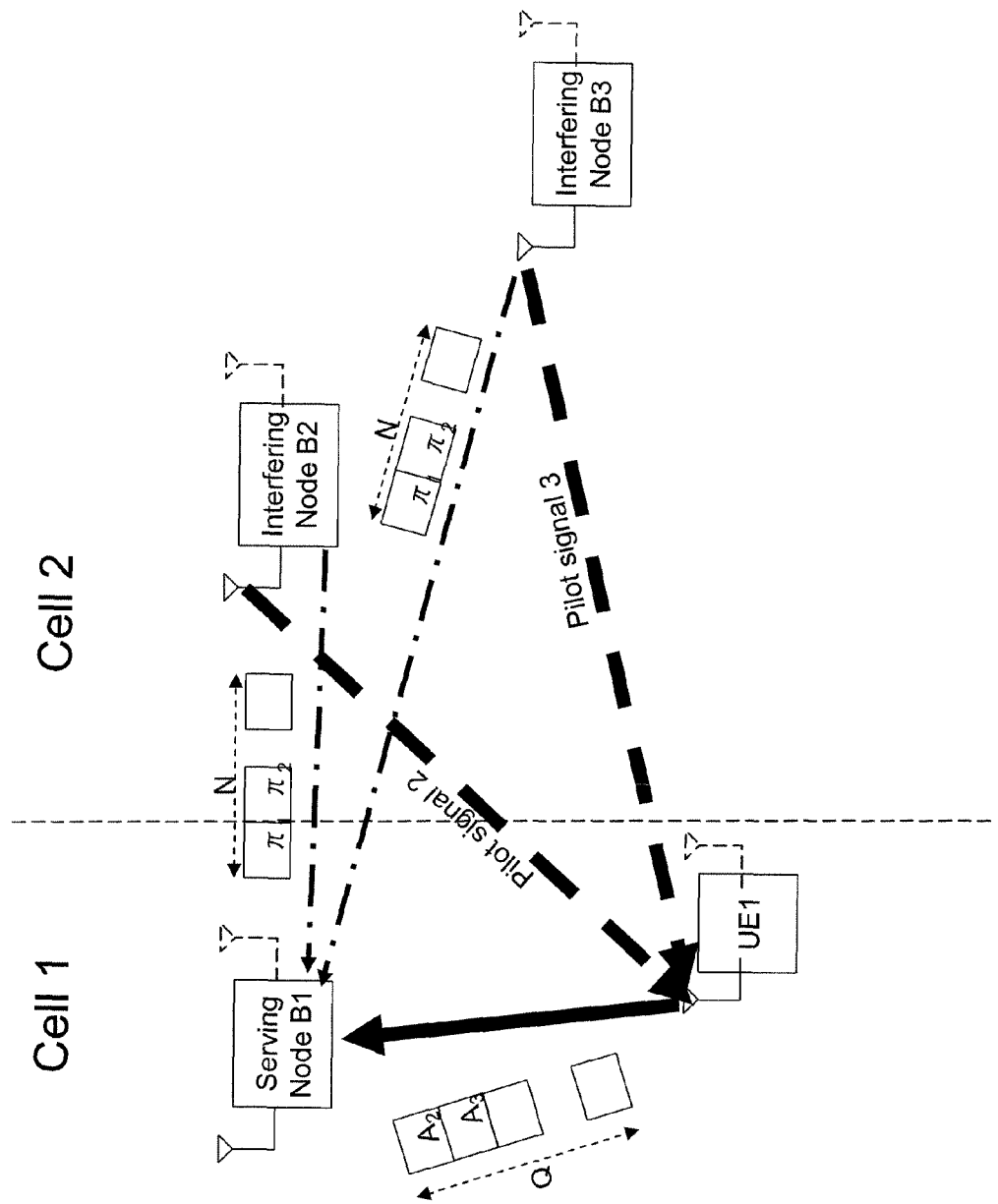
FIG. 5 shows a block diagram of the operating principle of the present invention.

In a first embodiment, shown in FIG. 5, the user equipment does not measure the interference power in a specific PRB for every interfering Node B. It instead measures only the interference power on a common (broadcast) pilot channel that transmits cell-specific pilot signals. The user equipment then sends feedback messages having Q fields only, and not PRB-specific feedback messages. It is assumed that each interfering Node B informs neighboring Node Bs about what PRBs it is actively using and possibly what power it is transmitting on every PRB. In this way, the serving Node B is able to estimate what interference power is sustained by each user equipment in its cell, for every PRB. The interference power for a specific PRB is the sum of the contributions of all interferers. The contribution of one interferer is the transmitted power for a specific PRB, less the attenuation measured for that interferer by the specific user equipment. More specifically, these can be expressed as follows.

Let's assume that with a certain time periodicity every Node B transmits a cell-specific pilot sequence $T_i = \{\theta_1, \ldots, \theta_\tau\}$, where $\tau$ is the sequence length. Let's then assume that the considered user equipment has knowledge of the Q pilot sequences of the main interfering Node Bs. The user equipment is then able to measure periodically the received power for each of the Q known pilot sequences. The vector of measured received power will take exactly the form of the previous equation (3).

If assumption is made that all Node Bs transmit the same pilot signal power, the vector of measured powers is inversely proportional to the long-term average attenuation seen by each interferer. In logarithmic units (i.e. decibel), inversion becomes a change of sign:

$$A_{nk} = \{\pi_P + \eta - p_1, \ldots, \pi_P + \eta - p_Q\} = \{a_{k_1}^{(n)}, \ldots, a_{k_Q}^{(n)}\} \quad (6)$$

where the scalar $\pi_P$ represents the pilot signal power at the transmit antenna, and $\eta$ is an optional term, used for the power normalization in the system, which should also take into account a possible power control mechanism on the pilot signal.

The k-th user equipment periodically feeds back the vector $A_{nk}$ to its serving Node B. Each one of the neighboring Node Bs then signals to the serving Node B the vector $P_i = \{\pi_{i1}, \ldots, \pi_{iN}\}$, where i is the index of the Node B, N is the total number of PRBs, and $\pi_{ij}$ is a quantized version of the power that the i-th Node B transmits on the j-th PRB (depending on signaling conventions, the value $\pi_{ij} = 0$ could be used to indicate that the i-th Node B does not use the j-th PRB).

For each time instant n, the interference power sustained by the k-th user equipment in the m-th PRB can be estimated by the serving Node B as (in logarithmic units):

$$\sigma_{km} = 10 \log_{10} \sum_{i=1}^{Q} 10^{\frac{\pi_{im} - a_{ki}}{10}} \quad (7)$$

where the time-dependency has been intentionally dropped in all the terms (index n).

It is also possible to compute the contributions to the interference power per PRB, specific for a given interfering Node B. The interference power sustained by the k-th user equipment in the m-th PRB and originated by the i-th Node B can be estimated by the serving Node B as (in logarithmic units):

$$s_{kmi} = \pi_{im} - a_{ki}, \ 1 \leq i \leq Q \quad (8)$$

This embodiment enables a reduction in uplink feedback by a factor N without a significant performance loss, the reason being that while fast-fading attenuation depends on the PRB, long-term attenuation is essentially constant over the whole bandwidth. Moreover, this embodiment permits a simplification of the hardware of the user equipments and reduced power consumption.

A second embodiment is based on a pessimistic estimate of interference power and allows a significant reduction of the overall signaling among Node Bs to be obtained. In particular, in this second embodiment, which may be regarded as a simplification of the first embodiment, an assumption is made that neighboring Node Bs do not signal the vector $P_i$ or that only the closest ones (first tier of interferers) do. In this case, equation (7) may be substituted by the following expression:

$$\sigma_{km} = 10 \log_{10} \sum_{i=1}^{Q} 10^{\frac{\tilde{\pi}_{im} - a_{ki}}{10}}, \quad (9)$$

$$\tilde{\pi}_{im} = \begin{cases} \pi_{im} & \text{if known} \\ \pi_{max} & \text{if } \pi_{im} \text{ not known to serving Node } B \end{cases}$$

where $\pi_{max}$ is the maximum power value that can be transmitted on one PRB.

It is also possible to define interference power contributions specific for one interfering Node B. The interference power sustained by the k-th user equipment in the m-th PRB and originated by the i-th Node B can be estimated by the serving Node B as (in logarithmic units):

$$s_{kmi} = \tilde{\pi}_{im} - a_{ki}, \quad (10)$$

$$\tilde{\pi}_{im} = \begin{cases} \pi_{im} & \text{if known} \\ \pi_{max} & \text{if } \pi_{im} \text{ not known to serving Node } B \end{cases}$$

$$1 \leq i \leq Q$$

In a third embodiment, which may be regarded as an extension of the first embodiment, measurement and feedback is performed like in the first embodiment, with one codebook used to vector-quantize the measurements, and the results of vector quantization can in turn be used for grouping the user equipments and other purposes (like evaluating if in general an interfering Node B has a negligible influence on a given user equipment). Then additional codebooks exist, in the quantity of one per PRB, which are used to vector-quantize the vectors whose components are defined in equation (8). The results of vector quantization are useful in the interference mitigation process. Additionally or alternatively to these additional codebooks, one single codebook could exist to vector quantize the vectors whose components are defined in equation (7). The results of vector quantization is useful in the interference mitigation process. What is important to notice is that this third embodiment retains fully the advantages of uplink feedback bandwidth reduction and reduction of hardware complexity and power consumption in the user equipment. The higher number of codebooks present in the Node B only means increased hardware complexity for the Node B.

In a fourth embodiment, which may be regarded as an extension of the second embodiment, one codebook is used to vector-quantize the measurements, and the results of vector quantization can in turn be used for grouping the user equipments and other purposes. Then, additional codebooks exist for each PRB and are used to vector quantize the vectors whose components are defined in equation (10). Additionally or alternatively, one single codebook could exist to vector quantize the vectors whose components are defined in equation (9). Like the previous case, also this fourth embodiment fully retains the advantages in terms of reduced uplink feedback and hardware complexity in the user equipments.

The invention claimed is:

1. A method for characterizing interference in a radio communication system comprising a plurality of radio transceiver stations capable of being configured to communicate with user equipment, comprising:
   receiving at a serving transceiver station quantities indicative of interference from interfering transceiver stations, the quantities being measured by the user equipment in radio communication with the serving transceiver station;
   associating at least one codebook with the serving transceiver station, the codebook comprising a number of codewords each representing a respective quantized interference power situation in an area covered by the serving transceiver station;
   identifying in the codebook a codeword representative of the quantities measured by the user equipment,
   wherein the codeword has components determined by a number of interfering transceiver stations measured by the user equipment;
   wherein the serving transceiver station is configured to communicate with the user equipment in a frequency band which is organized into a number of physical resource blocks; and
   determining, at the serving transceiver station, the interference powers received by the user equipment in the physical resource blocks of the user equipment, based on the quantities indicative of interference from interfering transceiver stations measured by the user equipment and on the transmission powers used by the interfering transceiver stations in the physical resource blocks.

2. The method of claim 1, wherein identifying in the codebook a codeword representative of the quantities measured by the user equipment comprises:
   identifying in the codebook the codeword closest to the quantities measured by the user equipment based on a selected norm.

3. The method of claim 1, wherein identifying in the codebook a codeword representative of the quantities measured by the user equipment comprises:
   identifying different codewords for different user equipment receiving a same interference from the interfering transceiver stations.

4. The method of claim 1, wherein identifying in the codebook a codeword representative of the quantities measured by the user equipment comprises:
   identifying a same codeword for different user equipment receiving the same interference from the interfering transceiver stations.

5. The method of claim 1,
   wherein associating at least one codebook with the serving transceiver station comprises:
   associating a codebook with each physical resource block.

6. The method of claim 1, wherein associating at least one codebook with the serving transceiver station comprises:
   associating the same codebook with several physical resource blocks.

7. The method of claim 1, wherein the number of codewords in the codebook is fixed.

8. The method of claim 1, wherein the number of codewords in the codebook is variable so as to keep a norm of the difference between quantities measured in succession by the same user equipment or by different user equipment and representative codewords in the codebook below a given threshold.

9. The method of claim 1, wherein associating at least one codebook with the serving transceiver station comprises: providing an initial codebook; and updating the codebook.

10. The method of claim 9, wherein the codebook is updated so as to keep a norm of the difference between quantities measured in succession by the same user equipment or by different user equipment and the representative codewords in the codebook below a given threshold.

11. The method of claim 9, wherein updating the codebook comprises:
    keeping a subset of the codewords in the codebook invariant to minimize, when new user equipment starts to be served by the serving transceiver station, a norm of the difference between the quantities measured by the user equipment and the respective representative codeword in the codebook.

12. The method of claim 9, wherein providing an initial codebook comprises:
collecting one or more sets of measured quantities; partitioning the set into sub-sets; computing centroids of the sub-sets; and forming the codebook with the computed centroids.

13. The method of claim 9, wherein providing an initial codebook comprises:
pseudo-randomly generating the initial codebook.

14. The method of claim 9, wherein providing an initial codebook comprises:
generating an initial codebook representing equal interference power of all the interfering transceiver stations.

15. The method of claim 9, wherein providing an initial codebook comprises:
generating an initial codebook representing very strong interference power situations.

16. The method of claim 9, wherein providing an initial codebook comprises:
generating an initial codebook representing a wide dynamic range in the interference powers of the strongest interfering transceiver stations and a small dynamic range in the interference powers of the weakest interfering transceiver stations.

17. The method of claim 1, wherein the measured quantities are indicative of interference from at least one subset of interfering transceiver stations.

18. The method of claim 17, wherein said at least one subset comprises a first tier of interfering transceiver stations around the serving transceiver station.

19. The method of claim 17, wherein said at least one subset comprises said first and a second tier of interfering transceiver stations around the serving transceiver station.

20. The method of claim 1, further comprising:
storing an index for each identified codeword, each index being indicative of the position of the codeword in the codebook.

21. The method claim 20, further comprising:
grouping the user equipment served thereby based on the stored indexes.

22. The method of claim 21, further comprising:
identifying at least one representative user equipment in a group of user equipment; and
requesting the representative user equipment to measure and send quantities indicative of interference from the interfering transceiver stations.

23. The method of claim 21, further comprising:
requesting the user equipment in the group to measure and send quantities indicative of interference from the interfering transceiver stations in a round robin fashion.

24. The method of claim 21, further comprising:
requesting the user equipment in a group and having low mobility within an area covered by the serving transceiver station, to measure quantities indicative of interference from the interfering transceiver stations.

25. The method claim 1, wherein the measured quantities indicative of interference from interfering transceiver stations comprise:
quantities indicative of powers of pilot signals transmitted by the interfering transceiver stations in respective pilot channels.

26. The method of claim 25, further comprising:
determining interference powers received by the user equipment in physical resource blocks, based on the powers of the pilot signals measured by the user equipment and on the transmission powers used by the interfering transceiver stations in physical resource blocks thereof.

27. The method of claim 25, further comprising:
determining interference powers received by the user equipment in physical resource blocks thereof, based on the powers of the pilot signals measured by the user equipment; wherein the transmission powers used by the interfering transceiver stations are the and on maximum transmission powers that may be used by the interfering transceiver stations in physical resource blocks thereof.

28. A radio communication system comprising a plurality of radio transceiver stations capable of being configured to communicate with user equipment and to implement the interference characterization method according to claim 1.

29. A non-transitory computer-readable storage medium having stored thereon a program comprising software code portions capable of implementing, when the computer program is run on the processing system, the interference characterization method according to claim 1.

30. A method for characterizing interference in a radio communication system including a plurality of radio transceiver stations capable of
being configured to communicate with user equipment in a frequency band which is organized into a number of physical resource blocks, the method including:
receiving at a serving transceiver station quantities indicative of the radiated interference power in the physical resource blocks from interfering transceiver stations, the quantities being measured by the user equipment in radio communication with the serving transceiver station;
the serving transceiver station exchanging with another transceiver station information based on the measured quantities;
associating a codebook comprising a number of codewords each representing a respective quantized interference power situation in an area covered by the serving transceiver station,
wherein the codeword has components determined by a number of interfering transceiver stations measured by the user equipment; and
determining, at the serving transceiver station, the radiated interference powers received by the user equipment in the physical resource blocks of the user equipment, based on the quantities indicative of interference from interfering transceiver stations measured by the user equipment and on the transmission powers used by the interfering transceiver stations in the physical resource blocks; and
negotiating a possible reduction of the radiated interference power over any physical resource blocks.

31. The method of claim 30, wherein the measured quantities are indicative of radiated interference power from at least one subset of
interfering transceiver stations.

32. The method of claim 31, wherein the at least one subset comprises a first tier of interfering transceiver stations around the serving transceiver station.

33. The method of claim 32, wherein said at least one subset comprises the first tier and a second tier of interfering transceiver stations around the serving transceiver station.

34. The method claim 30, further comprising: grouping the user equipment served by the serving transceiver station.

35. The method of claim 34, further comprising:
identifying at least one representative user equipment in a group of user equipment; and
requesting the representative user equipment to measure and send quantities indicative of the radiated interference power from the interfering transceiver stations.

36. The method of claim 34, further comprising:
requesting the user equipment in the group to measure and send quantities indicative of the radiated interference power from the interfering transceiver stations in a round robin fashion.

37. The method of claim 34, further comprising:
requesting the user equipment in a group and having low mobility within an area covered by the serving transceiver station, to measure quantities indicative of the radiated interference power from the interfering transceiver stations.

38. The method of claim 30, wherein the information indicative of the radiated interference power in the physical resource blocks from the interfering transceiver stations, comprises:
information indicative of the radiated interference powers of pilot signals transmitted by the interfering transceiver stations in respective pilot channels.

39. The method of claim 30, further comprising:
determining the radiated interference powers received by the user equipment in physical resource blocks based on the powers of pilot signals measured by the user equipment and on the transmission powers used by the interfering transceiver stations in physical resource blocks thereof.

40. The method of claim 38, further comprising:
determining the radiated interference powers received by the user equipment in physical resource blocks thereof, based on the powers of pilot signals measured by the user equipment; wherein the transmission powers used by the interfering transceiver stations is the and on maximum transmission powers that may be used by the interfering transceiver stations in physical resource blocks thereof.

41. A non-transitory computer-readable storage medium having stored thereon a program comprising software code portions capable of
implementing, when the computer program is run on the processing system, the interference characterization method according to claim 30.

* * * * *

UNITED STATES PATENT AND TRADEMARK OFFICE
CERTIFICATE OF CORRECTION

PATENT NO.         : 8,462,646 B2
APPLICATION NO.    : 12/449437
DATED              : June 11, 2013
INVENTOR(S)        : Sergio Barberis et al.

Page 1 of 1

It is certified that error appears in the above-identified patent and that said Letters Patent is hereby corrected as shown below:

In the Claims

Claim 27, col. 14, line 14, "stations are the and on maximum" should read
--stations are the maximum--.

Claim 40, col. 16, line 14, "station is the and on maximum" should read
--station is the maximum--.

Signed and Sealed this
Twenty-fourth Day of September, 2013

Teresa Stanek Rea
*Deputy Director of the United States Patent and Trademark Office*